Jan. 9, 1951  J. A. PEOPLES, JR  2,537,083
BACKLASH-COMPENSATED SERVO SYSTEM
Filed Oct. 22, 1945
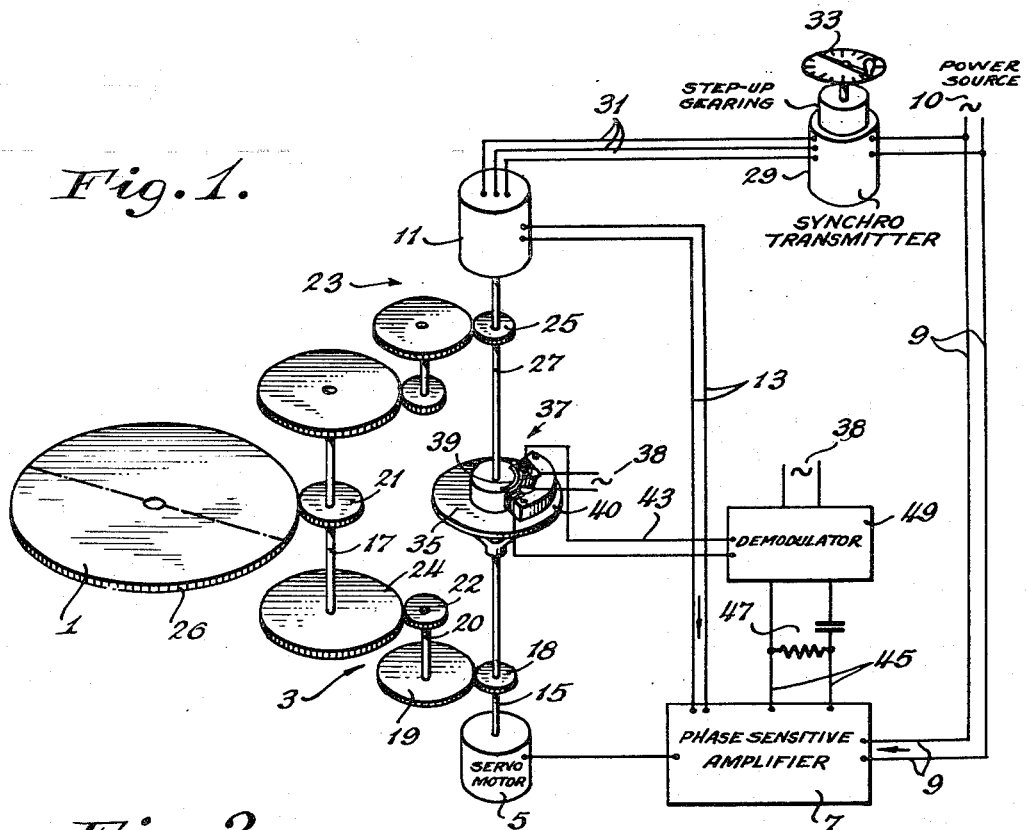
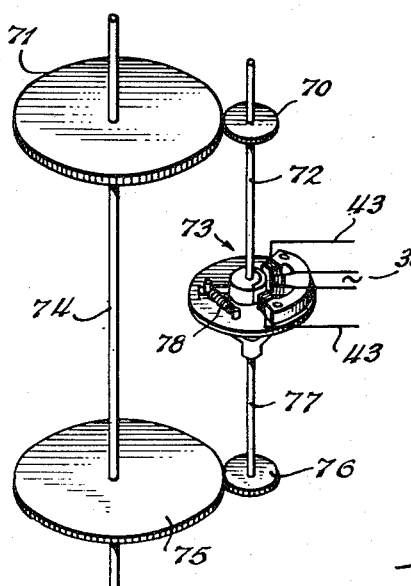
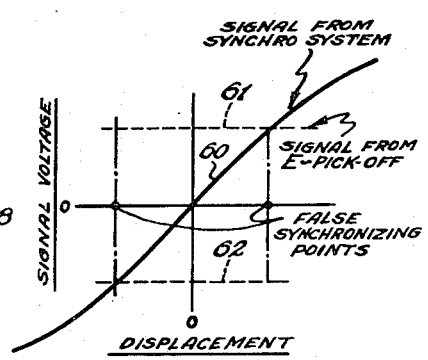
INVENTOR
JAMES A. PEOPLES, JR.
BY
ATTORNEY Patented Jan. 9, 1951

2,537,083

UNITED STATES PATENT OFFICE 2,537,083

BACKLASH-COMPENSATED SERVO SYSTEM

James A. Peoples, Jr., Woods Hole, Mass., assignor to The Sperry Corporation, a corporation of Delaware Application October 22, 1945, Serial No. 623,791

17 Claims. (Cl. 318—30)

The present invention relates generally to systems for controlling or transmitting power to a driven member in which the power transmission is characterized by its elasticity or flexibility, as a gear train having backlash, which is sufficient materially to affect the control over said system or its stability; and the present invention particularly relates to means for introducing corrections into such systems whereby to correct or compensate for the backlash, play or flexibility and the like in the system.

More particularly, the present invention relates to a servo system for positioning or driving a driven object through a transmission system of a somewhat elastic or flexible character, that is, one in which there is play between the driving and driven elements thereof, so that the control signal ordinarily derived from and as a measure of relative displacement between the driven object and a reference member has error therein because of such elasticity or play, thereby rendering the performance characteristics of the system relatively poor at and around zero signal.

In those systems, as servo systems, wherein a member is driven through a transmission such as a gear train having backlash or through any transmission in which play occurs or its flexible or elastic properties are apparent, it is possible under such conditions to make the servo stable by taking data from a shaft of the prime mover of the output of the servomotor. However, in so doing, the driven member may be inaccurately positioned by the amount of backlash or play in the transmission. On the other hand, inaccurate positioning of the driven member cannot occur when data is taken therefrom or from some other element positioned therewith rather than from the output of the servomotor. However, in the latter case, the performance characteristics of the servo will be entirely unsatisfactory because, for one reason, the backlash in the gear train produces a dead spot in the servo control.

It is the principal object of the present invention to provide in systems, or a servo system, of the foregoing characters means for providing the system with operating characteristics approximating those which the system would have in the absence of such play, elasticity, flexibility or backlash.

Still more particularly, the present invention relates to systems wherein the velocity or position of a driven object is controlled according to the setting or positioning of a reference member. Such systems of the position-control type ordinarily include a means for supplying what may be termed primary control signals corresponding to the relative displacement between the reference member and the driven object. In accordance with the present invention, and it is an object thereof, I provide a second signal-generating means which is responsive to relative movement between driving and driven elements of the transmission in the system. Preferably, the signal provided by said second signal-generating means is supplied as a further control signal and is dependent upon and supplied only under transient conditions in the transmission or when change of play, backlash and the like occurs.

A further object of the present invention, therefore, resides in providing in a control system, the operating characteristics of which are affected by play, elasticity, backlash or the like, a means for supplying a signal which is dependent upon changes in the amount of play, backlash, etc., said signal being combined with an original or primary control signal in such manner that the operating characteristics of the system are greatly improved and approximate those of a like system unaffected by play, backlash or the like.

A still further object of the present invention resides in supplying a secondary control signal voltage which is dependent upon transient conditions or which may be termed a transient signal voltage by measuring the amount of play or backlash existing in the system in terms of a D. C. voltage, and applying this voltage to a resistance-capacitance network so as to supply a voltage across the output of said network substantially only when a varying voltage is applied to the input thereof, any steady-state signal voltages being quickly dissipated or wiped out.

A still further object resides in providing an A. C. signal voltage which is proportional to the amount of play or backlash in a system, demodulating or rectifying this voltage and impressing it across an impedance-capacitance network or coupling it through a condenser to supply a signal voltage output only when the amplitude of the A. C. voltage changes, and combining the transient D. C. voltage with another control signal voltage in controlling the operation of the prime mover of the system.

Briefly, the principal object of the present invention is to supply means in a servo system to render it of a linear character when its linearity is otherwise affected by backlash, play and the like in the system.

With the foregoing and still other objects in view, my invention includes the novel elements and the combination and arrangements thereof described below and illustrated in the accompanying drawings, in which:

Fig. 1 schematically illustrates a servo system embodying means for improving the operating characteristics thereof in accordance with the present invention;

Fig. 2 schematically illustrates a modification; and

Fig. 3 illustrates by voltage curves the principal reason for using a correction voltage proportional to a transient rather than a steady-state condition.

It will be understood that within the broad scope of the present invention, the compensating means herein illustrated and described may be used for measuring and correcting for play, elasticity or flexibility or backlash and the like in many forms of transmission systems, and in the accompanying drawings I have shown a gear train or gear transmission primarily for illustrative and exemplary purposes.

Referring first to Fig. 1 wherein it may be considered that the present invention is illustrated as applied to a gun control system, a gun platform 1 is driven through a power gear train, indicated generally at 3, from a servomotor 5. For descriptive purposes it is presumed that the gear train 3 has backlash. The servomotor 5 is controlled by an amplifier 7 which is connected through conductors 9 to a suitable power source 10. Control signals, which may be considered as primary control signals, are derived from the synchro or data transmission system comprising the synchro transmitter 29 and the synchro transformer 11 through the leads 13. The gear train 3 includes a driving shaft 15, which may be employed in obtaining a true measure of the output of the servo and shaft 17 which is driven from shaft 15 through gears 18 and 19, shaft 20 and gears 22 and 24. Shaft 17 may drive the gun platform 1 through a pinion 21 meshing with gear 26 on the platform.

As already noted, in heavy-duty servo systems, where the driven members are driven by power gear trains, a considerable amount of backlash develops in the gear trains. This condition is particularly obnoxious in ordnance where accuracy of fire is of utmost importance. To overcome and compensate for the effects of backlash, as noted hereinabove, the present invention contemplates establishing a means for determining the effect of the backlash on the system, or the effect caused thereby on the linearity of the servo, and to apply to the system a correction corresponding in amount to the amount or effect of the backlash so determined whereby to render the system linear or to endow it with the characteristics it would have had had there been no backlash.

To effect the proposed corrections, a precision gear train is preferably employed and connected in shunt with the power train, either to the driven member or the servomotor output and to one element of a signal voltage generator, the other element of the signal generator being connected either with the driven member or the servo output as the case may be. In this manner, signals are provided which are in magnitude substantially proportional to the amount of play or backlash in the system. Such signals are then fed, in the embodiment illustrated, through a resistance-capacitance network to the amplifier controlling the servomotor to compensate for the backlash. The system shown includes a precision gear train 23 (having no backlash) driving a synchro transformer 11 and includes the pinion 25 which is mounted on shaft 27. The synchro system may comprise Selsyn-like units and the signal transformer 11 receives data from a synchro transmitter 29, through lines 31, the generator being energized from power source 10. A control or reference member 33, or, for example, the output of a computer, may be used to control the transmitter 29.

The synchro system or the output of synchro transformer 11 will depend upon the relative displacement between the rotors of the transmitter and transformer assuming that the stators are fixed in space. In other words, when the rotors of the two synchro units occupy corresponding positions in the fields of their stators, no voltage output will be derived from the transformer 11. Otherwise, the voltage output of signal transformer 11 is dependent in amplitude upon the relative displacement between the two rotors of the synchro units and this signal is supplied to the amplifier 7 to control the servomotor 5.

Shaft 15 or the output shaft of servomotor 5, in the somewhat schematically represented embodiment of the present invention, drives platform 35 on which one element of an E-type signal generator or transformer 73 is mounted. For example, the core 40 thereof is mounted on platform 35, while the armature 39 thereof is connected to the above-described shaft 27 and gear 25. In the present system, changes in signal voltage output derived from the E-pick-off are proportional to the relative displacement between shafts 15 and 27. Since shaft 15 constitutes the output of the servomotor and shaft 27 is connected to the driven object or gun platform 1 through a precision gear train having no backlash, the signal voltage output of the E-pick-off will be a measure of the play or backlash in the power gear train connecting the servomotor with the driven object or gun platform 1.

In accordance with the preferred form of the present invention, the backlash signal derived from the E-pick-off as an A. C. voltage is fed through leads 43 to a demodulator 49, and the demodulated or rectified signal is fed as a D. C. voltage to an impedance or resistance-capacitance (RC) network indicated generally at 47. The output of this network is supplied to the amplifier through leads 45 and combined therein with the signal derived from the synchro system. A source of alternating current 38 is employed preferably both to energize the E-pick-off and the demodulator whereby to provide a phase-sensitive operation of the demodulator or a direct-current voltage output from the demodulator having a polarity dependent upon the phase sense of the signal voltage derived from the E-pick-off. By choosing proper values of resistance and capacitance, any steady-state backlash signal wipes out so that the ultimate position of the driven member or the state of synchronization of the system is determined by and is dependent only upon the signal derived from the synchro system.

Although I have shown an E-type pick-off or signal voltage generator in combination with a demodulator and an RC network, it is to be understood that equivalent constructions and combinations of equivalent elements may be employed such, for example, as employing means for rotating the stator of the synchro transformer of one of the synchro units through a suitable dash-pot and spring connection.

The theory of the operation of the preferred form of my invention herein illustrated in Fig. 1 and above described, should be clearly understood from the following. The servomotor 5 is arranged to drive gear 1 or the positionable object and, synchronously therewith, one element of the signal transformer 11 in accordance with the voltage output from the amplifier 7. This voltage output is dependent upon the difference in angular relationship of the rotors of the synchro generator 29 and the signal transformer 11, the relative displacement of which serves to supply a primary control signal or error voltage to the amplifier 7. Additionally, a signal voltage is supplied to the amplifier from the RC network 47. This additional voltage is a transient and is generally proportional to change of displacement between the armature 39 and the core of the E-type pick-off 37. In other words, an additional signal voltage is supplied to the amplifier 7 which may be proportional to or at least is dependent upon change of backlash or change of relative relationship between the output of the servomotor 5 and the load or positionable object.

Fig. 3 indicates graphically the reason for employing a signal proportional to change of the amount of backlash rather than one proportional to a measure of backlash or displacement. It will be seen that the displacement error voltage which is derived from and is a measure of relative displacement between the rotors of the synchro-generator and signal transformer in a system having play, backlash or the like and which is represented by the curve 60, depends in amplitude or magnitude upon the magnitude of the displacement and in phase or polarity sense upon the direction in which the displacement has occurred. The dotted line 61 is intended to indicate graphically with no regard for relative values, the measure of backlash in one direction in the system or the output of the E pick-off 37 and line 62 represents the output of E pick-off 37 for backlash in an opposite direction. Obviously, if the servo were to drive the positionable object in any one direction, it would continue so to do until the rotors of the signal transformer and synchro-generator were in positional agreement provided no other signal voltage were applied to the amplifier. However, if a signal voltage proportional to the measure of backlash were employed it would provide maximum output as represented by the dash line 61 or 62 when the rotors of the synchro-generator and signal transformer were in positional agreement. Therefore, the servo would drive the signal transformer beyond such position until the displacement voltage derived therefrom is equal and opposite in polarity to the voltage derived from the E pick-off, and under these conditions, true synchronism of the signal transformer and synchro-generator would never be achieved.

Therefore, I employ a control voltage which is dependent upon change in the signal voltage derived from the E pick-off 37 and, preferably, after it has been demodulated or rectified to provide a D. C. signal voltage; or, I employ a signal voltage which is wiped out or not supplied to the amplifier under steady-state conditions.

The second or additional signal voltage which is dependent on changes in the magnitude or amplitude of the voltage derived from the E pick-off 37 is preferably applied in a degenerative sense to the amplifier and is algebraically added to or combined with the displacement signal obtained from the signal transformer 11. At the commencement of a cycle of operation, the pick-off 37 provides a voltage output changing in amplitude as a measure of change of backlash in the transmission. When the backlash is fully taken up, the amplitude of the voltage output of pick-off 37 will not vary and therefore the signal voltage supplied to the amplifier from the network 37 reduces to zero as is desired in order that the system may truly synchronize the positionable object with the controlling member.

The two signal voltages as so combined add together to provide a linear signal voltage change with respect to displacement, rendering the system linear as desired. For good stability, the control signal voltages should be linear with respect to displacement or error. By adding in a signal voltage of the character hereinbefore pointed out, it should be readily seen that the non-linear chararcteristics of the system occasioned by play or backlash and the like in the systems will be altered or compensation effected so that the system characteristics are made to conform generally to those of a linear system. That is to say, in the operation of the present invention, the operating characteristics of the system affected by backlash, play and the like will be made linear, or, substantially the same as what they would have been had the system been free from backlash and the like.

In some systems it may be impossible because of the physical structure or layout of the servo to include a gear train between the load and the synchro transformer as shown in Fig. 1. Since the function of the pick-off 37 is to measure the backlash or play in the power gear train or power transmission, it is merely necessary to shunt the power train, which has the undesirable backlash, by connecting a backlash-free transmission in series with a signal generator and between the load or driven object and the servo or prime mover. One rather simple arrangement is shown in Fig. 2 wherein one mesh of a power transmission is represented by the gears 70 and 71. One of these gears, such as gear 70, is connected through shaft 72 with, for example, the armature of an E-type pick-off indicated generally at 73, and which is preferably of the character indicated at 37 in Fig. 1. The other gear 71 of the train may be connected by means of shaft 74 through the precision gears 75 and 76 and shaft 77 with the core of the E-pick-off 73. In other words, one element of the E pick-off is positioned with the gear 70 and the other element thereof with the gear 71, thereby being operably connected to measure backlash or play between the gears 70 and 71. In this embodiment of my invention, the two parts of the E pick-off or its armature and core are biased by means of the spring 78 which is operatively connected at its opposite ends with the core and armature of the pick-off. Spring 78 is preferably arranged to urge the two elements of the pick-off in such relative directions as to take up any backlash which may exist in the precision gear train 75, 76.

Although, it is possible to adjust the pick-off or E transformer so that it provides zero voltage at or near the center of the backlash, the signal voltage being of opposite phase at the extreme positions and for relative movement of the parts of the transformer or signal generator to opposite sides of the zero voltage output position thereof, this adjustment is not essential. In fact, in a preferred embodiment of this invention, I propose to adjust the transformer off center so that it provides a signal voltage of but one phase sense which varies in magnitude with relative movement of the transformer parts. Under these conditions, it is then possible to employ a simple rectifier instead of a phase-sensitive demodulator.

This construction may be employed because a signal voltage is passed on to the amplifier only when a change occurs in the signal voltage derived from the signal generator or E transformer representing a change in the amount of backlash.

The polarity of the D. C. signal voltage derived from the network 47 is dependent on whether the voltage derived from the signal transformer is increasing or decreasing, said polarity being of one sense when the backlash is increasing and of the opposite sense when the magnitude of backlash decreases.

Broadly speaking, therefore, the present invention functions to cause the servo to operate as though no backlash existed in the system. Wipe out, of course, should be provided in order to maintain accuracy and correct synchronization in the system.

While I have described my invention in its preferred embodiments it is to be understood that the words which I have used are words of description rather than of limitation and that changes within the purview of the appended claims may be made without departing from the true scope and spirit of my invention in its broader aspects.

What is claimed is:

1. Means for driving an object into positional agreement with a controlling object comprising a driving motor for said driven object, control means for said motor responsive to the movements of said objects to cause said motor to drive said driven object into positional correspondence with said controlling object, and an auxiliary signal producing device for measuring the amount of angular displacement between the driven object and the driving motor output and for supplying a signal proportional to that amount to said control means.

2. In a transmission system wherein a driven object is controlled according to a reference member, a reference member, a driven object, a first means for supplying a signal corresponding to a displacement between said reference member and said driven object, a second signal generator for measuring the amount of backlash in the transmission system and for producing a signal proportional to that amount, and means for combining said signals and positioning the driven object according to the resultant signal.

3. In a transmission system wherein a driven object is controlled according to a reference member, a reference member, a driven object, a first means for supplying a signal corresponding to a displacement between said reference member and said driven object, a second signal generating device for measuring the amount of backlash in the transmission system and for generating an alternating current backlash signal proportional to that amount, means for demodulating the backlash signal to provide a corresponding D. C. voltage, and means for combining said first signal and the demodulated signal and positioning the driven object according to the resultant signal.

4. In a transmission system wherein a driven object is controlled according to a reference member, a reference member, a driven object, means for driving said object including a transmission connected therebetween, a first means for supplying a signal corresponding to a displacement between said reference member and said driven object, means for establishing the amount of said displacement and including a precision gear system interposed between the driven object and said driving means and a second signal-generating means, the second signal-generating means generating a second signal substantially proportional to play in said transmission, and means for combining said first and second signals and for controlling said driving means in accordance with the resultant.

5. In a transmission system wherein a driven object is controlled according to a reference member, a reference member, a driven object, a servomotor connected through a power gear train to the driven object, an amplifier connected in controlling relation to the servomotor, a first means for supplying a signal to the amplifier corresponding to a displacement between said reference member and said driven object, a precision gear system interposed between the driven object and said servomotor and a second signal-generating means, the said second signal-generating means generating a second signal substantially proportional to backlash in said power gear train, and means for supplying said first and second signals to said amplifier, the output of said amplifier serving to control said servomotor in accordance with the resultant of said two signals.

6. In a control system employing a servomotor and a power gear train driven thereby for operating a driven member, the gear train having backlash, the combination with the power gear train of a precision gear train having no backlash, a signal generating means, the precision gear train being operatively connected with said signal-generating means, the servo motor being connected to said signal-generating means, a connection between said precision gear train and said driven member, a servomotor control means, and an impedance-capacitance network between said servomotor control means and said signal-generating means.

7. In a control system of the character described, a servomotor, a power gear train connecting said motor in driving relation to a driven member, said power gear train having backlash, signal generating means, a precision gear train having substantially zero backlash operatively connected with said signal-generating means, said precision gear train being connected to said driven member and said signal-generating means being connected directly with the output of said servo, a signal voltage amplifier connected in controlling relation to said servomotor, a second signal-generating means for controlling the speed and direction of operation of said servomotor and connected with said amplifier, and means connected between said first-mentioned signal-generating means and said amplifier for blocking out signal voltages therefrom under steady-state conditions but for supplying a signal voltage thereto when the output of said first-mentioned signal-generating means varies.

8. A control system of the character recited in claim 6, in which the servomotor control means includes an amplifier and said signal-generating means provides an A. C. signal voltage; said combination further including means for rectifying said A. C. signal voltage and a network for supplying the rectified signal to said amplifier.

9. A system comprising a motor, a positionable object adapted to be positioned thereby, a gear train operatively connecting said object and said motor, an amplifier having its output connected in controlling relation with said motor, a control member, means for supplying to the input of said amplifier a first signal voltage substantially proportional in magnitude to the amount of relative angular displacement between said member and object, precision-measuring means coupling said object and said motor including a signal-generating means for producing a second signal voltage corresponding to changes in backlash in said gear train between said object and motor, and means for supplying said latter signal voltages to the input of said amplifier.

10. In a positional follow-up control wherein a reversible motor drives a controlled object into angular correspondence with a Selsyn-type data transmitter, an amplifier having its output connected to control the speed and direction of rotation of said reversible power motor, means for producing a first signal from relative displacement between the transmitter and the driven object, means for producing a second signal proportional to the displacement between said motor and said object, means for wiping out said second signal under steady-state conditions, and means for impressing the said second signal upon the input circuit of said amplifier.

11. A positional control system comprising a controlling member, a controlled object, motive means for actuating said controlled object, means for controlling said motive means in accordance with relative displacement between said object and member, and an auxiliary control member for measuring changes in relative angular position between said motive means and said controlled object and for effecting a further control over said motive means proportional to said measured quantity.

12. A positional control system comprising a motor, a controlled object driven therefrom, a controlling object, means for controlling said motor, means for producing an electric signal variable in accordance with changes in the relative angular positions of said two objects, means for supplying said signal to said motor-control means, means for producing a second electric signal variable in accordance with the relative displacement of said controlled object and said motor, means for wiping out said second signal under steady-state conditions but for supplying a signal to said motor-control means when said second signal varies in magnitude.

13. In a positional control system for a driven object having substantial inertia, a servomotor for driving said object, amplifier means for controlling the operation of said servomotor, a data transmission system including a transmitter and a receiver for producing a signal voltage proportional to the positional disagreement between said object and transmitter rotor for controlling said amplifier means, a signal-generator including two relatively movable parts, one thereof being positioned with said object and the other thereof with the output of said servo, and means including a condenser for supplying the output of said signal-generator to said amplifier means.

14. In a system of the character described, a control member, a motor, an object driven by said motor, a transmission connecting said object and motor, signal-responsive means for controlling said motor, means for controlling the direction and rate of operation of said motor, and an auxiliary control member for measuring and supplying to said signal-responsive means a signal proportional to the amount of play in the transmission between said object and said motor.

15. In a system of the character described, a control member, a servomotor and a positionable object, a power transmission connecting said servomotor and positionable object, signal-responsive control means for said motor, means for supplying to said signal-responsive means a first control signal substantially proportional to the amount of relative angular displacement between said positionable object and said control member, means for measuring the amount of play in said transmission and for supplying a signal substantially proportional thereto, and means for supplying said last-mentioned signal to said signal-responsive means when undergoing change in magnitude thereof but blocking said signal from the signal-responsive means under steady-state conditions.

16. The combination with a transmission operatively connecting a prime mover with a load and characterized by its flexibility or the presence of play therein, of motion-transmitting means having substantially zero play and connected between said motor and load, and a signal generator having one element thereof operatively connected to one end of said motion-transmitting means, the other element of said signal generator and the other end of said motion-transmitting means being connected with said prime mover and with said load, respectively.

17. In a system comprising a motor and a controlled object driven therefrom through a gear train having blacklash, an amplifier having its output system connected to control said motor, a controlling object, means for impressing upon the input of said amplifier an electromotive force variable in accordance with changes in the relative displacement of said objects, and a signal-producing device for measuring and supplying a signal to said amplifier proportional to the measured backlash between said motor and controlled object.

JAMES A. PEOPLES, Jr.

REFERENCES CITED

The following references are of record in the file of this patent:

UNITED STATES PATENTS

| Number | Name | Date |
| --- | --- | --- |
| 1,672,677 | Ellis | June 5, 1928 |
| 1,977,624 | Davis | Oct. 23, 1934 |